US012812598B2

(12) United States Patent
Li et al.

(10) Patent No.: US 12,812,598 B2
(45) Date of Patent: Nov. 24, 2026

(54) METHOD OF ALLOCATING PAGING PACKET IDS, TERMINAL DEVICE, AND CORE NETWORK DEVICE

(71) Applicant: GUANGDONG OPPO MOBILE TELECOMMUNICATIONS CORP., LTD., Dongguan (CN)

(72) Inventors: Haitao Li, Dongguan (CN); Yi Hu, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 277 days.

(21) Appl. No.: 18/625,965

(22) Filed: Apr. 3, 2024

(65) Prior Publication Data

US 2024/0267886 A1 Aug. 8, 2024

Related U.S. Application Data

(63) Continuation of application No. PCT/CN2022/070156, filed on Jan. 4, 2022.

(51) Int. Cl.
*H04W 68/02* (2009.01)
*H04W 60/00* (2009.01)

(52) U.S. Cl.
CPC ........... *H04W 68/02* (2013.01); *H04W 60/00* (2013.01)

(58) Field of Classification Search
None
See application file for complete search history.

(56) References Cited

U.S. PATENT DOCUMENTS

2003/0050078 A1* 3/2003 Motegi ................. H04W 60/04 455/574
2013/0344903 A1* 12/2013 Li ........................... H04W 4/70 455/458

(Continued)

FOREIGN PATENT DOCUMENTS

CN 102647666 A 8/2012
CN 113260023 A 8/2021

OTHER PUBLICATIONS

Nokia (Rapporteur) [AT115-e] [043] [ePowSav] Paging Subgrouping (Nokia) 3GPP TSG-RAN WG2 Meeting # 115 Electronic R2-2109094 Aug. 27, 2021 (Aug. 27, 2021); Full text.

(Continued)

*Primary Examiner* — Adolf Dsouza
(74) *Attorney, Agent, or Firm* — Ladas & Parry LLP

(57) ABSTRACT

A method of allocating paging group IDs includes: receiving, by a terminal device, a registration accept message from a core network device, where the registration accept message includes first information, the first information includes N paging group IDs allocated for a paging area list registered by the terminal device in a core network, the paging area list includes M paging area identities, and both M and N are positive integers. After receiving, by the terminal device, the first information from the core network device, the method further includes: receiving, by the terminal device, second information from the core network device, where the second information is configured to update the paging packet IDs, and the second information is configured to modify one or more paging group ID which has been allocated to one or more paging area identity.

14 Claims, 4 Drawing Sheets

(56) References Cited

U.S. PATENT DOCUMENTS

| | | | | |
|---|---|---|---|---|
| 2020/0205121 | A1 | 6/2020 | Yang | |
| 2021/0360582 | A1 | 11/2021 | Priyanto et al. | |
| 2022/0039046 | A1 * | 2/2022 | Ianev | H04W 60/00 |
| 2023/0051617 | A1 * | 2/2023 | Tiwari | H04W 4/12 |
| 2024/0031925 | A1 * | 1/2024 | Tiwari | H04W 48/18 |

OTHER PUBLICATIONS

Nokia et al. Paging in NR at HF operation 3GPP TSG-RAN WG2 NR # 97 R2-1700807, Feb. 17, 2017 (Feb. 17, 2017); full text.

Spreadtrum Communications Paging design consideration 3GPP TSG RAN WG2 # 99 R2-1707977 Aug. 25, 2017 (Aug. 25, 2017); Full text.

R2-115e Chair Notes EOM; Conclusion of RAN2-115e meeting; Aug. 27, 2021; R2 accounts that all the cells within the registration area support the same number of CN assigned subgroups, i.e. no reapplying of CN assigned group ID to RAN subgroup ID (will revise only if series issues are found).

International Search Report and Written Opinion, International Application No. PCT/CN2022/070156, mailed Oct. 10, 2022 (13 pages).

* cited by examiner

METHOD OF ALLOCATING PAGING PACKET IDS, TERMINAL DEVICE, AND CORE NETWORK DEVICE

CROSS REFERENCE TO RELATED APPLICATIONS

The present disclosure is a continuation of International Application No. PCT/CN2022/070156 filed Jan. 4, 2022, which is herein incorporated by reference in its entirety.

TECHNICAL FIELD

The present disclosure relates to a field of communications, and in particular to a method of allocating paging packet IDs, a terminal device, and a core network device.

BACKGROUND

NR (New Radio) systems support paging packet. In order to improve energy-saving performances of terminal devices, related technology regarding the paging packet is required to be further researched.

SUMMARY OF THE DISCLOSURE

Embodiments of the present disclosure provide a method of allocating paging packet IDs, a terminal device, and a core network device. The technical solution is as follows.

According to a first aspect of the embodiment of the present disclosure, a method of allocating paging packet IDs is provided. The method includes receiving, by a terminal device, first information from a core network device, wherein the first information includes N paging packet IDs allocated for a paging area list registered by the terminal device in a core network, the paging area list includes M paging area identities, and both M and N are positive integers.

According to a second aspect of the embodiments of the present disclosure, a terminal device is provided. The terminal device includes a memory and a processor. The memory is configured to store a computer program. The processor is configured to execute the computer program to implement the method of allocating the paging packet IDs which is performed by the terminal device described above.

According to a third aspect of the embodiments of the present disclosure, a core network device is provided. The core network device includes a memory and a processor. The memory is configured to store a computer program. The processor is configured to execute the computer program to implement the method of allocating the paging packet IDs which is performed by the core network device described above.

DETAILED DESCRIPTION

Figure 1:
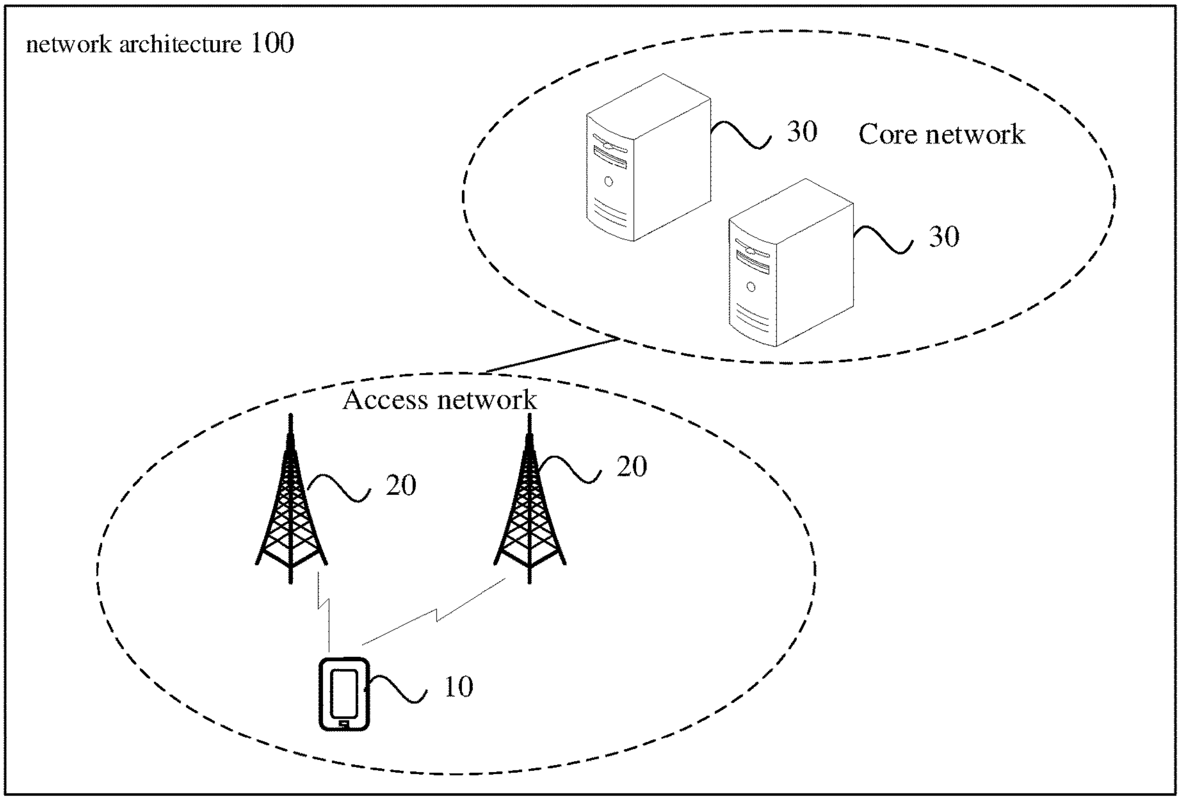
FIG. 1 is a schematic diagram of a network architecture according to an embodiment of the present disclosure.

In order to make the purpose, technical solution, and advantages of the present disclosure clearer, the implementations of the present disclosure are further described in detail below in conjunction with the accompanying drawings.

Network architectures and service scenarios described in the embodiments of the present disclosure are for the purpose of more clearly illustrating the technical solution of the embodiments of the present disclosure, and do not constitute limitations to the technical solution provided in the embodiments of the present disclosure. A person of ordinary skill in the art may know that, with the evolution of the network architectures and the emergence of new service scenarios, the technical solution provided in the embodiments of the present disclosure is equally applicable to similar technical problems.

The technical solution of the embodiments of the present disclosure may be applied to various communication systems, such as a Global System of Mobile communication (GSM) system, a Code Division Multiple Access (CDMA) system, a Wideband Code Division Multiple Access (WCDMA) system, a General Packet Radio Service (GPRS), a Long Term Evolution (LTE) system, an Advanced long term evolution (LTE-A) system, a New Radio (NR) system, an evolution system of the NR system, a LTE-based access to unlicensed spectrum (LTE-U) system, a NR-based access to unlicensed spectrum (NR-U) system, a Non-Terrestrial Network (NTN) system, a Universal Mobile Telecommunication System (UMTS), a Wireless Local Area Network (WLAN), Wireless Fidelity (WiFi), a 5th-generation communication (5th-Generation, 5G) system, or other communication systems, etc.

In general, the number of connections supported by traditional communication systems is limited and also easy to be implemented. However, with the development of communication technologies, mobile communication systems will not only support traditional communications, but also support, e.g., a (Device-to-device) (D2D) communication, a Machine to Machine (M2M) communication, a Machine Type Communication (MTC), a Vehicle to Vehicle (V2V) communication, or a Vehicle to everything (V2X)) communication, etc. The embodiments of the present disclosure may also be applied to these communication systems.

A communication system in the embodiments of the present disclosure may be applied to a Carrier Aggregation (CA) scenario, or may also be applied to a Dual Connectivity (DC) scenario, and may also be applied to a Standalone (SA) deploying networks scenario.

The communication system in the embodiments of the present disclosure may be applied to an unlicensed spectrum. The unlicensed spectrum may also be considered as a shared spectrum. Alternatively, the communication system in the embodiments of the present disclosure may also be applied to a licensed spectrum. The licensed spectrum may also be considered as an unshared spectrum.

The embodiments of the present disclosure may be applied to a Non-Terrestrial Network (NTN) system, or may also be applied to a Terrestrial Network (TN) system.

As shown in FIG. 1, FIG. 1 illustrates a schematic diagram of a network architecture 100 according to an embodiment of the present disclosure. The network architecture 100 may include a terminal device 10, an access network device 20, and a core network device 30.

The terminal device 10 may refer to a user equipment (UE), an access terminal, a user unit, a user station, a mobile station, a remote station, a remote terminal, a mobile device, a wireless communication device, a user agent, or a user apparatus. In some embodiments, the terminal device 10 may also be a cellular phone, a cordless phone, a session initiation protocol (SIP) phone, a wireless local loop (WLL) station, a personal digital assistant (PDA), a handheld device having a wireless communication function, a computing device, or other processing devices connected to a wireless modem, an in-vehicle device, a wearable device, a terminal device in a $5^{th}$ generation communication system, or a terminal device in a future evolved public land mobile network (PLMN), or the like, which is not limited in the embodiments of the present disclosure. For convenience of description, devices mentioned above are collectively referred to as terminal devices. The number of the terminal devices 10 is generally multiple. One or more terminal device 10 may be distributed in a cell managed by the access network device. In the embodiments of the present disclosure, the term "terminal device" and the term "UE" usually convey the same meaning, and they may be used interchangeably, while those skilled in the art may understand their meanings.

The access network device 20 is a device deployed in an access network to provide a wireless communication function to the terminal device 10. The access network device 20 may include various forms of macro base stations, micro base stations, relay stations, access points, and the like. In systems using different wireless access technologies, names of devices having the function of the access network device may be different, e.g., which is referred to as a gNodeB or a gNB in a 5G NR system. The name of "the access network device" may change with the evolution of the communication technology. For convenience of description, in the embodiments of the present disclosure, the above-described apparatuses providing the wireless communication function for the terminal device 10 are collectively referred to as the access network device. In some embodiments, the terminal device 10 and the core network device 30 may establish a communication relationship through the access network device 20. Exemplarily, in a Long Term Evolution (LTE) system, the access network device 20 may be one or more eNodeB in an Evolved Universal Terrestrial Radio Access Network (EUTRAN). In the 5G NR system, the access network device 20 may be one or more gNB in a Radio Access Network (RAN).

The core network device 30 is a device deployed in the core network. The function of the core network device 30 is to provide user connectivity, management of users, to complete a bearer of the service, and to serve as an interface provided by a bearer network to an external network. For example, the core network device in the 5G NR system may include an Access and Mobility Management Function (AMF) entity, a User Plane Function (UPF) entity, and a Session Management Function (SMF) entity, etc.

In some embodiments, the access network device 20 and the core network device 30 communicate with each other via a certain air interface technology, such as an NG interface in the 5G NR system. The access network device 20 and the terminal device 10 communicate with each other via a certain air interface technology, such as a Uu interface.

The term "5G NR system" in the embodiments of the present disclosure may also be referred to as a 5G system or an NR system, but a person skilled in the art may understand the meaning thereof. The technical solution described in the embodiments of the present disclosure may be applicable to the LTE system, the 5G NR system, or may also be appliable to a subsequent evolution system of the 5G NR system, or may also be appliable to other communication systems, such as a Narrow Band Internet of Things (NB-IoT) system, which is not limited in the present disclosure.

In the embodiments of the present disclosure, the network device may provide service for a cell. The terminal device communicates with the network device through a transmission resource (e.g., a frequency domain resource, or in other words, a spectrum resource) employed by the cell.

The cell may be a cell corresponding to the network device (such as, the base station). The cell may belong to a macro base station or a base station corresponding to a small cell. The small cell herein may include a Metro cell, a Micro cell, a Pico cell, a Femto cell, etc. These small cells have characteristics of a small coverage area and a low transmission power, and are suitable to provide a high-speed data transmission service.

Before introducing the technical solution of the present disclosure, some background technology knowledge involved in the present disclosure is introduced and illustrated firstly. The following relevant technology may be arbitrarily combined with the technical solution of the embodiments of the present disclosure as an alternative solution, and these combinations all fall into the scope of the embodiments of the present disclosure. The embodiments of the present disclosure include at least part of the following contents.

1. 5G NR Paging Mechanism

Functions of the paging mechanism includes two aspects. In one aspect, the network device is allowed to page the terminal device through a paging message when the terminal device is in an idle (RRC_IDLE) state or in an inactive (RRC_INACTIVE) state. In the other aspect, the network device is allowed to notify the terminal device of a system message change or public waring information, such as earthquakes, tsunamis, etc., through a short message. In this case, the paging mechanism is appliable to all Radio Resource Control (RRC) states of the terminal device, which include a connected (RRC_CONNECTED state.

In an example, paging channels include a Physical Downlink Control Channel (PDCCH) scrambled by a Paging Radio Network Temporary Identifier (P-RNTI), and a PDSCH (Physical Downlink Share Channel) scheduled by the PDCCH. Exemplarily, the described-above paging message is transmitted in the PDSCH. The described-above short message occupies 8 bits and is transmitted in the PDCCH.

For the terminal device in the idle state or the inactive state, since no other data communication exist between the terminal device and the network device, the terminal device may non-continuously listen to the paging channels for saving the power of the terminal device, i.e., employing a Paging Discontinuous Reception (DRX) mechanism. Under the Paging DRX mechanism, the terminal device is only required to listen to the paging message during a PO (Paging Occasion) of each DRX period. In the embodiments of the present disclosure, the PO includes a series of listening occasions for the PDCCH. In some embodiments, the PO consists of multiple time slots. In addition, the Paging DRX mechanism also includes a concept of a Paging Frame (PF). The PF refers to a radio frame (for example, the radio frame is 10 ms). In some embodiments, the radio frame includes at least one PO. Alternatively, the radio frame includes a starting position of the at least one PO.

In an example, a cycle of the Paging DRX is determined by both a public cycle in system broadcast and a specified cycle configured in a high layer signaling (e.g., Non Access Stratum (NAS) signaling). In some embodiments, the terminal device takes the minimum cycle of the two as the paging DRX cycle. Exemplarily, one paging DRX cycle includes at least one PO. Which PO is exactly employed by the terminal device is related to an identify of the terminal device. A manner of the terminal device determining the PF and the PO in one paging DRX cycle is exemplarily illustrated in the following.

A System Frame Number (SFN) number of the PF is determined through the following formula:

$$(SFN + \text{PF\_offset}) \bmod T = (T \ div\ N) * (\text{UE\_ID} \bmod N)$$

T is a DRX cycle of the terminal device receiving paging. In an example, the network device broadcasts one default DRX cycle. If a RRC message or a high layer message (e.g., a NAS message) configures a specified DRX cycle for the terminal device, the terminal device takes the minimum one of a DRX cycle broadcasted by the network device and a DRX cycle configured by the RRX message or the high layer message (e.g., the NAS message) as the T. If the RRC message or the high layer message (e.g., a NAS message) does not configure the specified DRX cycle for the terminal device, the terminal device takes the DRX cycle broadcasted by the network device as the T. N is the number of the PFs in one DRX cycle. Ns is the number of POs in one PF. PF_offset is a time domain offset configured for determining a PF.

An Index number (i_s) of the POs being located in one PF is determined by the following formula:

$$\text{i\_s} = \text{floor}\left(\text{UE\_ID}/N\right) \bmod Ns$$

UE_ID is a remainder of dividing a Temporary Mobile Subscriber Identity (TMSI) of terminal device with 1024.

For the terminal device, both positions of the PFs in one paging DRX cycle and Indexes of the POs may be determined based on the above formulas. In an example, the PO is composed of at least one PDCCH monitoring occasion. One PO contains X PDCCH monitoring occasions. X is a positive integer and equal to the number of actually transmitting Synchronization Signal Blocks (SSBs) broadcasted by a system message. After the terminal device determines the positions of the PFs, the Indexes of the POs, and the number of the PDCCH monitoring occasions in the PO, the terminal device is only required to determine a starting position of the first PDCCH monitoring occasion in the PO through relevant configuration parameters. The starting position may be configured through the high layer signaling, or may be obtained based on the Indexes of the POs. After the terminal device determines the starting position, the terminal device may blindly detect the paging message based on a determined PO.

2. Paging Packet Technology

The NR system supports the paging pocket. As LTE systems, each terminal device calculates the Paging Frame (PF) and the Paging Occasion (PO) based on the UE_ID and the DRX cycle thereof, which results in each paging occasion only being associated to some specific terminal device, instead of being shared by all terminal devices. Such intrinsic pocket mechanism based on the paging occasion may reduce a rate of false alarms for paging between different POs, because the terminal device is only required to listen to a PO in which it is.

One goal of the Release 17 (R17) terminal energy saving subject is to further reduce the rate of the false alarms for paging between the different terminal devices which listen to the same PO based on PO pocket, i.e., further introducing a subgrouping in one PO. In this way, when only terminal devices of a part of subgrouping are being are paged, terminal devices of the other subgrouping are allowed not to wake up to receive the paging message, so as to achieve a purpose of saving the power. Currently, the R17 supports two paging pocket technologies described in Solution 1: UE_ID Based Pocket Similar to calculating the POs based on the UE_ID, this solution further allocates terminal device mapped to the same PO to different packet through the UE_ID. For example, the system message may broadcast the maximum pocket number in each PO. Pocket information belonging to terminal devices in this PO may be obtained through the UE_ID modeling the maximum pocket number, or other relevant operations.

Solution 2: Network-Allocated Packet

Different form a manner of calculating the PO based on the UE_ID, in the network-allocated solution, the terminal device directly obtains the pocket information from a core network (e.g., AMF). The terminal device does not need to care about what characteristic the packet information is determined based on, and an exact allocation strategy is dependent on network implementation.

Based on a current standardization progress of the R17 terminal energy saving project, it has been agreed to introduce the following mechanisms 1-3 to reduce the false alarms for paging:

1. introducing Paging Early Indication (PEI) designed based on the PDCCH, i.e., the network transmits the PEI before the PO, and the terminal device determines to listen to the paging message in a corresponding PO normally, or to skip listening to the paging message based on a received PEI.

2. Introducing a paging mechanism based on terminal grouping (or, in other words, UE grouping). That is, the terminal devices allocated to the same PO are further grouped. The network may indicate which grouping or groupings is/are the paging message targeted at, such that terminal devices of the other groupings are not required to receive the paging message again. Paging pocket indication information may be carried in the PEI.

3. For the paging mechanism based on the terminal grouping, a paging pocket ID (referred to as a group ID for short) in which the terminal device is located may be determined by the core network. If the core network does not assign the group ID to the terminal device, the group ID may be determined based on the UE_ID.

At an initial stage of subject discussion, some discussions with respect to paging pocket being allocated by which network entity have been formed. If the pocket is allocated by a base station, an influence on the core network may be reduced. However, different base stations (especially base stations of different vendors) may employ different pocket strategies, which may result in usage confusion of terminal groupings between different cells. The reason is that a terminal device in the RRC_IDLE state (idle state) and the RRC_INACTIVE state (inactive state) may occur cell reselection at any time, which may not be known by the base station, such that the rate of the false alarms for paging is increased instead. On the contrary, if the paging pocket is allocated by the core network, pocket strategies may be ensured to be uniform within a certain paging area, which eliminates a trouble of different packet strategies among base stations. However, currently no relevant technology has proposed in which area the core network allocates paging pocket IDs and under which cases the paging pocket IDs may be required to be updated.

The present disclosure proposes allocating the paging pocket for paging area identities (e.g., TACs/TAIs). Allocating the paging pocket IDs for the paging area identities (e.g., the TACs/TAIs) may maximum the flexibility of the core network employing a different pocket strategy for each of the paging area identifies. Since a registration area of each terminal device may be different, when the pocket strategy for the registration area of each terminal device is the same, then the network may be required to ensure to achieve the same pocket strategy in a large area, which is not conducive to network deployment, especially in scenarios of different network device vendors deploying networks.

Figure 2:
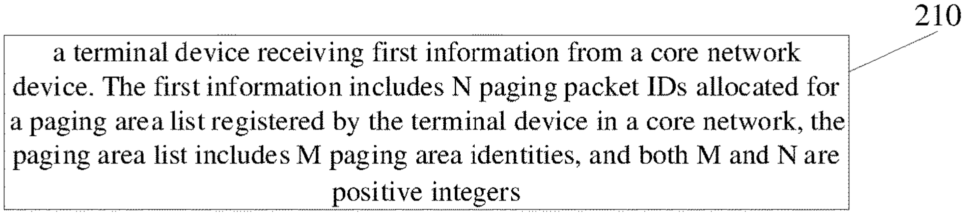
FIG. 2 is a flowchart of a method of allocating paging pocket IDs according to an embodiment of the present disclosure.

As shown in FIG. 2, FIG. 2 illustrates a flowchart of a method of allocating paging pocket IDs according to an embodiment of the present disclosure. The method may be performed in the network architecture shown in the FIG. 1. The method may include an operation 210.

In an operation 210, the method includes a terminal device receiving first information from a core network device. The first information includes N paging packet IDs allocated for a paging area list registered by the terminal device in a core network, the paging area list includes M paging area identities, and both M and N are positive integers.

The core network device transmits the first information to the terminal device. Accordingly, the terminal device receives the first information from the core network device. In some embodiments, the core network device is an AMF.

In the embodiments of the present disclosure, the paging packet IDs are allocated to the terminal device by the core network device. The core network device may allocate the N paging packet IDs for the M paging area identities in the paging area list registered by the terminal device in the core network.

The paging area list may include one or more paging area identity. The paging area identities are identity information of paging areas and are configured to identify and distinguish different paging areas. In some embodiments, a paging area identity is a Tracking Area Code TAC or a Tracking Area Identity TAI.

In some embodiments, N is less than or equal to M. In one example, N is equal to M. For example, the paging area list contains 3 paging area identities, and the core network device allocates 3 paging pocket IDs for the 3 paging area identities. In another example, N is less than M. For example, the paging area list contains the 3 paging area identities, and the core network device allocates 2 paging pocket IDs for the 3 paging area identities.

In some embodiments, one paging area identity is correspondingly allocated with one paging packet ID. Paging pocket IDs correspondingly allocated for arbitrary two different paging area identities may be the same, or may also be different.

In some embodiments, at least two different paging area identities exist in the M paging area identities in the paging area list and are correspondingly allocated with different paging packet IDs; and/or at least two different paging area identities exist in the M paging area identities in the paging area list and are correspondingly allocated with the same paging packet ID.

In some embodiments, each of the M paging area identities in the paging area list is allocated with a corresponding paging packet ID; or at least one of the M paging area identities in the paging area list is not allocated with the corresponding paging packet ID.

Figure 3:
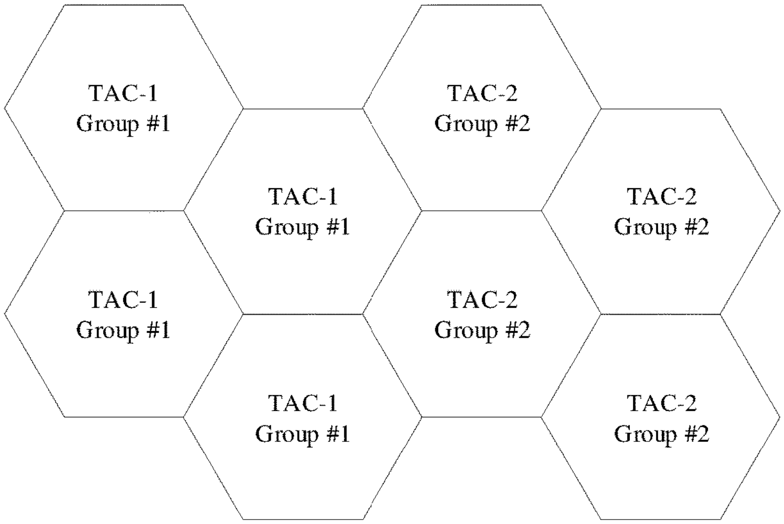
FIG. 3 is a schematic view of a result of allocating the paging pocket IDs according to an embodiment of the present disclosure.

Exemplarily, as shown in FIG. 3, it is assumed that the paging area list registered by the terminal device in the core network includes 2 paging area identifies, which are denoted as TAC-1 and TAC-2, and that a paging pocket ID allocated by the core network device for TAC-1 is Group #1 and a paging pocket ID allocated by the core network device for TAC-2 is Group #2.

Figure 4:
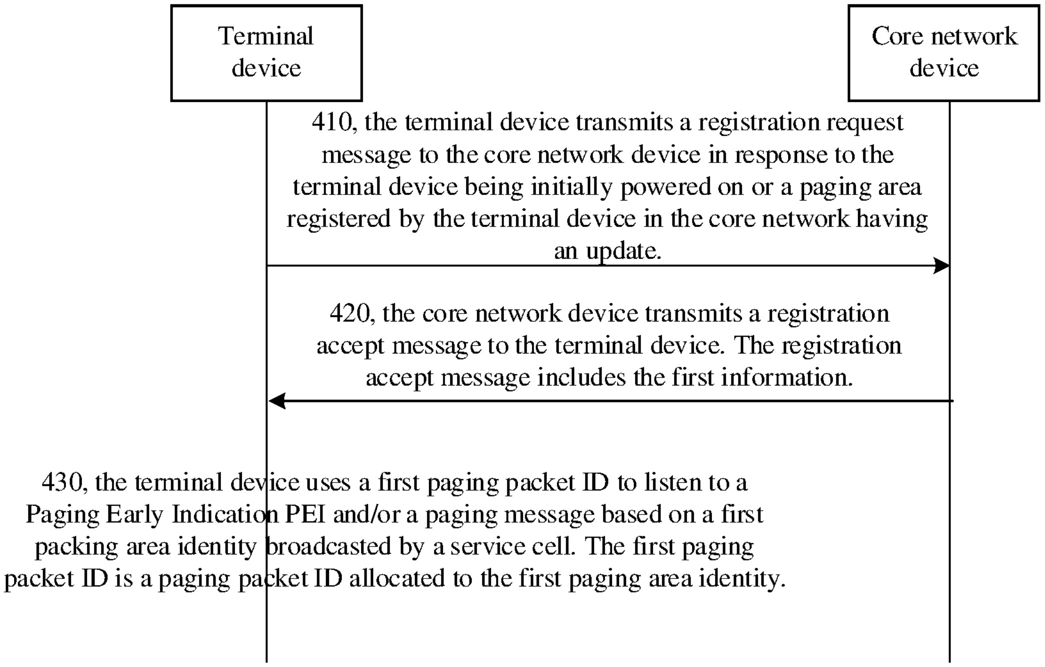
FIG. 4 is a flowchart of a method of allocating paging pocket IDs according to another embodiment of the present disclosure.

In some embodiments, as shown in FIG. 4, the method of allocating the paging packet IDs may include at least one of the following operations 410 to 430.

In an operation 410, the method includes the terminal device transmitting a registration request message to the core network device in response to the terminal device being initially powered on or a paging area registered by the terminal device in the core network having an update.

Accordingly, the core network device receives the registration request message from the terminal device. The registration request message may be a REGISTRATION REQUEST message.

In an operation 420, the method includes the core network device transmitting a registration accept message to the terminal device. The registration accept message includes the first information.

Accordingly, the terminal device receives the registration accept message from the core network device. The registration accept message may be a REGISTRATION ACCEPT message.

In response to the terminal device being initially powered on, the core network device may include paging pocket ID information (i.e., "the first information" described above) in the registration accept message. In response to the paging area registered by the terminal device in the core network having the updated, in a case of the core network being required to allocate a corresponding paging pocket ID for a newly-registered paging area, the core network device may also include the paging pocket ID information (i.e., "the first information" described above) in the registration accept message.

In an operation 430, the method includes the terminal device using a first paging packet ID to listen to a Paging Early Indication PEI and/or a paging message based on a first packing area identity broadcasted by a service cell. The first paging packet ID is a paging packet ID allocated to the first paging area identity.

The first paging area identity may be any one of the M paging area identities described above. When the terminal device listens to paging in a current service cell, assuming that a paging area identity broadcasted by the current service cell is the first paging area identity, then the terminal device determines a paging pocket ID corresponding to the first paging area identity, i.e., a paging pocket ID (denoted as "the first paging pocket ID") allocated to the first paging area identity. The first paging pocket ID may be one of the N paging pocket IDs described above. The terminal device then uses the first paging pocket ID to listen to the paging. For example, as shown in FIG. 3, assuming that the paging area identity broadcasted by the current service cell of the terminal device is TAC-1, then the terminal device uses the Group #1 to listen to the PEI and/or the paging message in the current service cell.

In some embodiments, the terminal device uses the first paging packet ID to listen to the PEI. When the PEI indicating that the first paging pocket ID is paged, the terminal device receives a paging message corresponding to the PE; and otherwise, the terminal device does not receive the paging message corresponding to the PEI.

In some embodiments, in a case of the terminal device being in the idle state (RRC_IDLE state) or the inactive state (RRC_INACTIVE state), the terminal device uses the first paging pocket ID to listen to the PEI and/or the paging message based on the first packing area identity broadcasted by the service cell.

The technical solution provided in the embodiments of the present disclosure, allocating the paging pocket IDs for the paging area identities (e.g., the TACs/TAIs) may maximum the flexibility of the core network employing the different pocket strategy for each of the paging area identifies. Since the registration area of each terminal device may be different, when the pocket strategy for the registration area of each terminal device is the same, then the network may be required to ensure to achieve the same pocket strategy in the large area, which is not conducive to the network deployment, especially in the scenarios of the different network device vendors deploying the networks.

Figure 5:
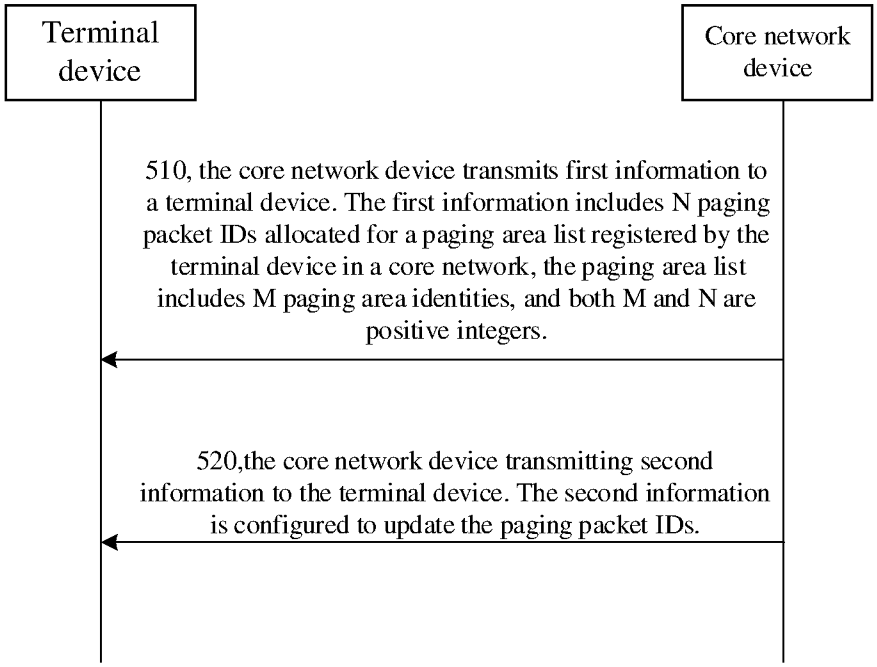
FIG. 5 is a flowchart of a method of updating the paging pocket IDs according to an embodiment of the present disclosure.

In some embodiments, as shown in FIG. 5, the embodiments of the present disclosure also support that the core network device updates the paging packet IDs. The process may include at least one of operations 510 to 520 in the following.

In an operation 510, the process includes the core network device transmitting first information to a terminal device. The first information includes N paging packet IDs allocated for a paging area list registered by the terminal device in a core network, the paging area list includes M paging area identities, and both M and N are positive integers.

Accordingly, the terminal device receives the first information from the core network device.

In an operation 520, the process includes the core network device transmitting second information to the terminal device. The second information is configured to update the paging packet IDs.

Accordingly, the terminal device receives the second information from the core network device.

In some embodiments, the second message is configured to release one or more paging packet ID which has been allocated to one or more paging area identity; and/or modifying the one or more paging packet ID which has been allocated to the one or more paging area identity. For example, in an initial paging pocket ID information (i.e., "the first information" described above) transmitted by the core network device to the terminal device, the paging pocket ID allocated for the TAC-1 is the Group #1 and the paging pocket ID allocated for the TAC-2 is the Group #2. The core network device may release the one or more paging pocket ID which has been allocated to the one or more paging area identity, e.g., releasing the Group #1 which has been allocated to the TAC-1. That is, the Group #1 is no longer allocated to the TAC-1 for use. The core network device may also modify the one or more paging pocket ID which has been allocated to the one or more paging area identity, e.g., modifying the paging pocket ID allocated to TAC-1 from the Group #1 to Group #3.

In some embodiments, the core network device transmits the second information to the terminal device in response to a characteristic of the terminal device having a change. For example, the above-mentioned characteristic may be a characteristic related to saving energy, e.g., including, but not limited to, at least one of a paging probability, a mobility characteristic, and a battery characteristic. The terminal device may actively notify the core network device of an event that the characteristic has been changed and/or a changed characteristic, or the core network device may also obtain a situation that the characteristic of the terminal device has been changed in other ways, which is not limited in the embodiments of the present disclosure.

In some embodiments, the core network device transmits the second information to the terminal device in response to a load condition of paging pocket having a change. For example, when the core network device finds that one or more load of one or some paging packet is too large or too small, the core network device hopes to adjust the one or more load of the one or some paging packet. In this case, an update process for the paging pocket IDs may be performed.

In some embodiments, the core network device transmits a NAS message to the terminal device. The NAS message includes the second information. Accordingly, the terminal device receives the NAS message from the core network device. In some embodiments, the NAS message is a configuration update command message. The configuration update command message may be a CONFIGURATION UPDATE COMMAND message.

Figure 6:
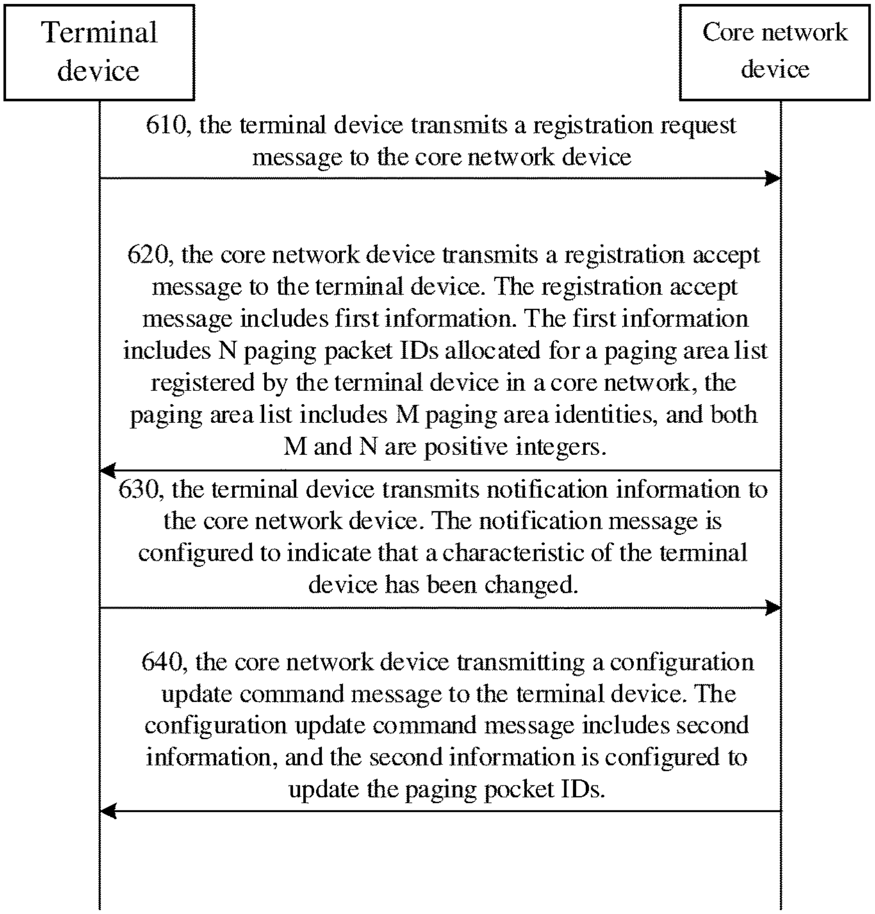
FIG. 6 is a flowchart of a method of allocating and updating the paging pocket IDs according to an embodiment of the present disclosure.

As shown in FIG. 6, FIG. 6 is a flowchart of a method of allocating and updating the paging pocket IDs according to an embodiment of the present disclosure. The method may include at least one of operations 610-640 in the following.

In an operation 610, the method includes the terminal device transmitting a registration request message to the core network device.

In an operation 620, the method includes the core network device transmits a registration accept message to the terminal device. The registration accept message includes first information. The first information includes N paging packet IDs allocated for a paging area list registered by the terminal device in a core network, the paging area list includes M paging area identities, and both M and N are positive integers.

In an operation 630, the method includes the terminal device transmitting notification information to the core network device. The notification message is configured to indicate that a characteristic of the terminal device has been changed.

In an operation 640, the method includes the core network device transmitting a configuration update command message to the terminal device. The configuration update command message includes second information, and the second information is configured to update the paging pocket IDs.

In the technical solution provided in the embodiments of the present disclosure, through introducing an update process for paging pocket, it is conductive for the core network device to adapt the terminal device to the most suitable paging pocket based on the change of the characteristic of the terminal device or the change of the load condition of the paging pocket.

It is to be noted that related operations performed by the terminal device described above may be separately implemented as a method at a terminal device side and related operations performed by the core network device described above may be separately implemented as a method at a core network device side. In addition, various embodiments provided in the present disclosure may be combined arbitrarily. Details which are not described in detail in an embodiment may refer to the introduction and illustration of relevant contents in another embodiment.

The following description is apparatus embodiment of the present disclosure, which may be configured to perform method embodiments of the present disclosure. Details undisclosed in the apparatus embodiments of the present disclosure may refer to the method embodiments of the present disclosure.

Figure 7:
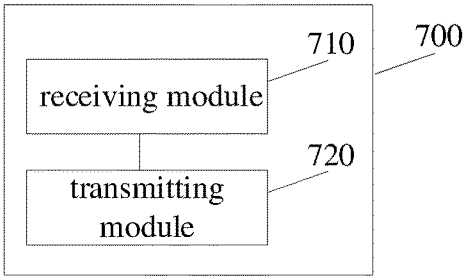
FIG. 7 is a block view of an apparatus of allocating the paging pocket IDs according to an embodiment of the present disclosure.

As shown in FIG. 7, FIG. 7 illustrates a block view of an apparatus of allocating the paging pocket IDs according to an embodiment of the present disclosure. The apparatus has functions of implementing method examples at the terminal device side, which are implemented through a hardware or may be implemented by the hardware executing a corresponding software. The apparatus may be the terminal device described in the above, or may also be arranged in the terminal device. As shown in FIG. 7, the apparatus 700 includes a receiving module 710.

The receiving module 710 is configured to receive first information from a core network device. The first information includes N paging packet IDs allocated for a paging area list registered by the terminal device in a core network, the paging area list includes M paging area identities, and both M and N are positive integers.

In some embodiments, N is less than or equal to M.

In some embodiments, one paging area identity is correspondingly allocated with one paging packet ID.

In some embodiments, at least two different paging area identities exist in the M paging area identities and are correspondingly allocated with different paging packet IDs; and/or at least two different paging area identities exist in the M paging area identities and are correspondingly allocated with the same paging packet ID.

In some embodiments, each of the M paging area identities is allocated with a corresponding paging packet ID; or at least one of the M paging area identities is not allocated with the corresponding paging packet ID.

In some embodiments, the paging area identities are Tracking Area Codes TACs or Tracking Area Identity TAIs.

In some embodiments, the receiving module 710 is configured to receive a registration accept message from the core network device. The registration accept message includes the first information.

In some embodiments, as shown in FIG. 7, the apparatus 700 further includes a transmitting module 720.

In some embodiments, the transmitting module 720 is configured to transmit a registration request message to the core network device in response to the terminal device being initially powered on or a paging area registered by the terminal device in the core network having an update.

In some embodiments, the receiving module 710 is further configured to use a first paging packet ID to listen to a Paging Early Indication PEI and/or a paging message based on a first packing area identity broadcasted by a service cell, wherein the first paging packet ID is a paging packet ID allocated to the first paging area identity.

In some embodiments, the receiving module 710 is further configured to use the first paging packet ID to listen to the PEI. The receiving module 710 is configured to receive a paging message corresponding to the PEI in response to the PEI indicating that the first paging pocket ID is paged; and otherwise not to receive the paging message corresponding to the PEI.

In some embodiments, in response to the terminal device being in an idle state or an inactive state, the terminal device uses the first paging packet ID to listen to the PEI and/or the paging message based on the first packing area identity broadcasted by the service cell.

In some embodiments, the receiving module 710 is further configured to receive second information form the core network device, wherein the second information is configured to update the paging packet IDs.

In some embodiments, the second information is configured to release one or more paging packet ID which has been allocated to one or more paging area identity; and/or modifying the one or more paging packet ID which has been allocated to the one or more paging area identity.

In some embodiments, the core network device transmits the second information to the terminal device in response to a characteristic of the terminal device having a change; or the core network device transmits the second information to the terminal device in response to a load condition of paging pocket having a change.

In some embodiments, the receiving module 710 is further configured to receive a Non Access Stratum NAS message from the core network device, wherein the NAS message includes the second information.

In some embodiments, the NAS message is a configuration update command message.

In some embodiments, the core network device is an Access and Mobility Management Function AMF entity.

Figure 8:
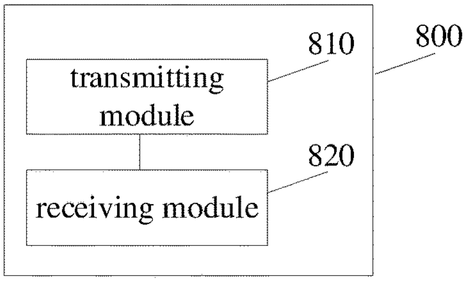
FIG. 8 is a block view of an apparatus of allocating the paging pocket IDs according to another embodiment of the present disclosure.

As shown in FIG. 8, FIG. 8 illustrates a block view of an apparatus of allocating the paging pocket IDs according to another embodiment of the present disclosure. The apparatus has functions of implementing method examples at the core network device side, which are implemented through a hardware or may be implemented by the hardware executing a corresponding software. The apparatus may be the core network device described in the above, or may also be arranged in the core network device. As shown in FIG. 8, the apparatus 800 includes a transmitting module 810.

The transmitting module 810 is configured to transmit first information to a terminal device, wherein the first information includes N paging packet IDs allocated for a paging area list registered by the terminal device in a core network, the paging area list includes M paging area identities, and both M and N are positive integers.

In some embodiments, N is less than or equal to M.

In some embodiments, one paging area identity is correspondingly allocated with one paging packet ID.

In some embodiments, at least two different paging area identities exist in the M paging area identities and are correspondingly allocated with different paging packet IDs; and/or at least two different paging area identities exist in the M paging area identities and are correspondingly allocated with the same paging packet ID.

In some embodiments, each of the M paging area identities is allocated with a corresponding paging packet ID; or at least one of the M paging area identities is not allocated with the corresponding paging packet ID.

In some embodiments, the paging area identities are Tracking Area Codes TACs or Tracking Area Identity TAIs.

In some embodiments, the transmitting module 810 is configured to transmit a registration accept message to the terminal device, wherein the registration accept message includes the first information.

In some embodiments, as shown in FIG. 8, the apparatus 800 further includes a receiving module 820.

In some embodiments, the receiving module 820 is configured to receive a registration request message from the terminal device, wherein the registration request message is transmitted in a case of the terminal device being initially powered on or a paging area registered by the terminal device in the core network having an update.

In some embodiments, the terminal device uses a first paging packet ID to listen to a PEI and/or a paging message based on a first packing area identity broadcasted by a service cell, wherein the first paging packet ID is a paging packet ID allocated to the first paging area identity.

In some embodiments, the terminal device uses the first paging packet ID to listen to the PEI; and the terminal device receives a paging message corresponding to the PEI in response to the PEI indicating that the first paging pocket ID is paged; and otherwise, the terminal device does not receive the paging message corresponding to the PEI.

In some embodiments, in response to the terminal device being in an idle state or an inactive state, the terminal device uses the first paging packet ID to listen to the PEI and/or the paging message based on the first packing area identity broadcasted by the service cell.

In some embodiments, the transmitting module 810 is further configured to transmit second information to the terminal device, wherein the second information is configured to update the paging packet IDs.

In some embodiments, the second information is configured to release one or more paging packet ID which has been allocated to one or more paging area identity; and/or modifying the one or more paging packet ID which has been allocated to the one or more paging area identity.

In some embodiments, the transmitting module 810 is further configured to transmit the second information to the terminal device in response to a characteristic of the terminal device having a change; or the transmitting module 810 is further configured to transmit the second information to the terminal device in response to a load condition of paging pocket having a change.

In some embodiments, the transmitting module 810 is further configured to transmit a Non Access Stratum NAS message to the terminal device, wherein the NAS message includes the second information.

In some embodiments, the NAS message is a configuration update command message.

In some embodiments, the core network device is an Access and Mobility Management Function AMF entity.

With respect to the apparatuses in the above embodiments, a concrete manner of each module performing an operation has been described in detail in the embodiments relating to the method, which is not illustrated herein. It is to be noted that, when the apparatuses mentioned in the above embodiments implement functions thereof, a division of each function module is only as an example illustration. In actual applications, the functions may be allocated to different function modules according to needs. That is, an interior structure of a device is divided into different function modules to complete a whole or a part of functions described above. In addition, the apparatuses provided in the above embodiments and the method embodiments belong to the same concept, and a concrete implementation process of the apparatuses may refer to the method embodiments for details, which is not repeated herein.

Figure 9:
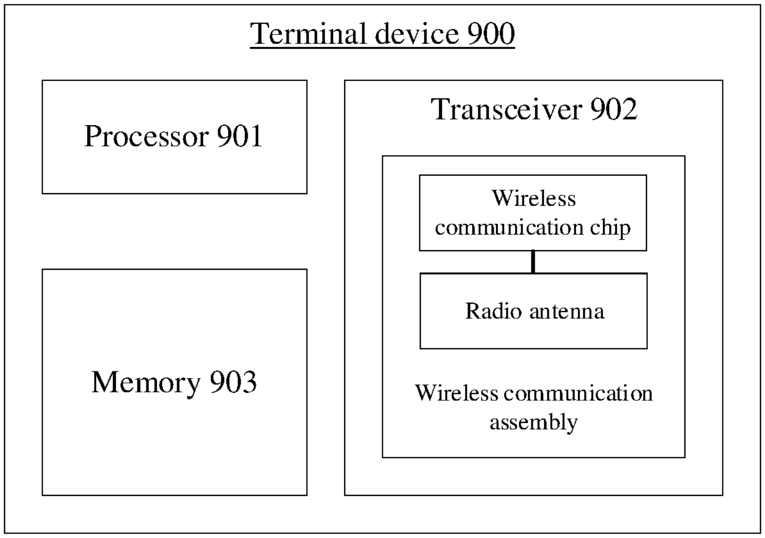
FIG. 9 is a structural schematic view of a terminal device according to an embodiment of the present disclosure.

As shown in FIG. 9, FIG. 9 illustrates a structural schematic view of a terminal device 900 according to an embodiment of the present disclosure. The terminal device 900 may be configured to perform operations of the method performed by the terminal device in the above embodiments. The terminal device 900 may include a processor 901, a transceiver 902, and a memory 903.

The processor 901 includes one or more processing core. The processor 901 performs various functional applications and information processing by running a software programs and modules.

The transceiver 902 may include a receiver and a transmitter. For example, the receiver and the transmitter may be implemented as the same wireless communication component, which may include a wireless communication chip and a radio frequency antenna.

The memory 903 may be connected to the processor 901 and the transceiver 902.

The memory 903 may be configured to store a computer program executed by the processor. The processor 901 is configured to execute the computer program to implement each operation performed by the terminal device in the method embodiments described above.

In addition, the memory 903 may be implemented by any type of volatile or non-volatile storage device, or a combination thereof. Volatile or non-volatile storage devices include, but are not limited to: a disk or an optical disk, an electrically erasable programmable read-only memory, an erasable programmable read-only memory, a static ready-to-access memory, a read-only memory, a magnetic memory, a flash memory, and a programmable read-only memory.

In an exemplary embodiment, the transceiver 902 is configured to receive first information from a core network device, the first information includes N paging packet IDs allocated for a paging area list registered by the terminal device in a core network, the paging area list includes M paging area identities, and both M and N are positive integers.

Details which are not described in detail in the above embodiments may refer to the introduction and illustration in the method embodiments above, which are not repeated herein.

Figure 10:
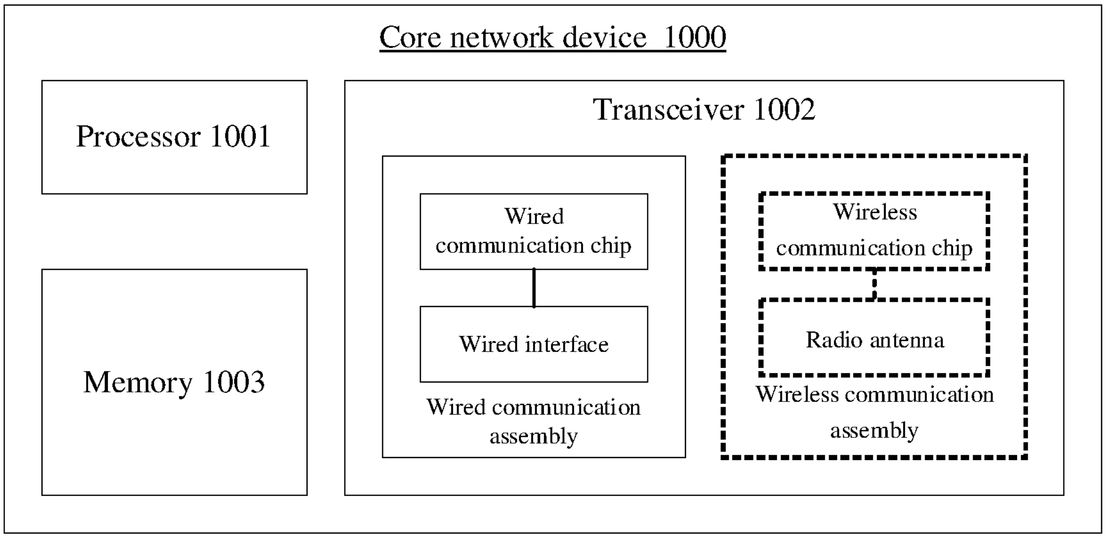
FIG. 10 is a structural schematic view of a core network device according to an embodiment of the present disclosure.

As shown in FIG. 10, FIG. 10 a structural schematic view of a core network device 1000 according to an embodiment of the present disclosure. The core network device 1000 may be configured to perform operations of the method performed by the core network device in the above embodiments. The core network device 1000 may include a processor 1001, a transceiver 1002, and a memory 1003.

The processor 1001 includes one or more processing core. The processor 1001 performs various functional applications and information processing by running a software programs and modules.

The transceiver 1002 may include a receiver and a transmitter. For example, the transceiver 1002 may include a wired communication assembly. The wired communication assembly may include a wired communication chip and a wired interface (e.g., a fiber optic interface). In some embodiments, the 1002 may further include a wireless communication assembly. The wireless communication assembly includes a wireless communication chip and a radio frequency antenna.

The memory 1003 may be connected to the processor 1001 and the transceiver 1002.

The memory 1003 may be configured to store a computer program executed by the processor. The processor 1001 is configured to execute the computer program to implement each operation performed by the core network device in the method embodiments described above.

In addition, the memory 1003 may be implemented by any type of volatile or non-volatile storage device, or a combination thereof. Volatile or non-volatile storage devices include, but are not limited to: a disk or an optical disk, an electrically erasable programmable read-only memory, an erasable programmable read-only memory, a static ready-to-access memory, a read-only memory, a magnetic memory, a flash memory, and a programmable read-only memory.

In an exemplary embodiment, the transceiver 1002 is configured to transmit first information to a terminal device, wherein the first information includes N paging packet IDs allocated for a paging area list registered by the terminal device in a core network, the paging area list includes M paging area identities, and both M and N are positive integers.

Details which are not described in detail in the above embodiments may refer to the introduction and illustration in the method embodiments above, which are not repeated herein.

The embodiments of the present disclosure also provide a computer-readable storage medium. The storage medium stores a computer program, and the computer program is configured to be executed by a processor of a terminal device or a core network device to implement the method of allocating the paging pocket IDs described above.

In some embodiments, the computer-readable storage medium may include, e.g., a Read-Only Memory (ROM), a Random-Access Memory (RAM), a Solid State Drive (SSD), or an optical disk. The RAM may include a Resistance Random Access Memory (ReRAM) and a Dynamic Random Access Memory (DRAM).

The embodiments of the present disclosure also provide a chip. The chip includes a programmable logic circuit and/or program instruction. When the chip is run on the terminal device or the core network device, the method of allocating the paging pocket IDs described above is implemented.

The embodiments of the present disclosure also provide a computer program product or a computer program. The computer program product or computer program includes computer instructions. The computer instructions are stored in a computer-readable storage medium. A processor of the terminal device or a core network device reads the computer instructions from the computer-readable storage medium and executes the computer instructions to implement the method of allocating the paging pocket IDs described above.

It should be understood that the term "indicate" may be indicating directly, or may also be indicating indirectly, or may also indicate an association relationship. For example, A indicates B, which may mean that A indicates B directly, e.g., B may be accessed through A; or mean that A indicates B indirectly, e.g., A indicates C and B may be accessed through C; or mean that A and B have an association relationship.

In the description of the embodiments of the present disclosure, the term "corresponding" may indicate that the two have a direct or indirect corresponding relationship, or may also indicate that the two have an association relationship, or may also be an indicating and indicated relationship, a configuring and configured relationship, etc.

The term "multiple" mentioned in the description refers to two or more. The term character "and/or" describes an association relationship of the associated objects, which indicates that three relationships may exist. For example, A and/or B, which may indicate A exists alone, both A and B exist, and B exists alone. The character "/" generally indicates that associated objects before and after "/" are in an "or" relationship.

The wording "greater than or equal to" may indicate greater than or equal to, or indicate greater than, and the wording "less than or equal to" may indicate less than or equal to, or indicate less than.

In addition, numberings of the operations described in the description only exemplarily shows a possible execution order. In some other embodiments, the above operations may also be not executed in accordance with an order of the numberings. For example, the operations of two different numberings are performed at the same time, or are performed in accordance with an inverse order of the order shown in the drawings, which is not limited in the embodiments of the present disclosure.

Those skilled in the art should appreciate that, in one or more of the above-described examples, the functions described in the embodiments of the present disclosure may be implemented through a hardware, a software, a firmware, or any combination thereof. When implemented through the software, the functions may be stored in a computer-readable medium or transmitted as one or more instructions or codes on the computer-readable medium. The computer-readable medium includes a computer storage medium and a communication medium. The communication medium includes any medium which facilitates the transmission of a computer program from one place to another place. The storage medium may be any available medium which may be accessed by a general purpose or specialized computer.

The above description is only exemplary embodiments of the present disclosure and is not intended to limit the present disclosure. Any modification, equivalent substitution, improvement, etc., made within the spirit and principle of the present disclosure shall fall into the scope of the present disclosure.

What is claimed is:

1. A method of allocating paging group IDs, comprising:

receiving, by a terminal device, a registration accept message from a core network device, wherein the registration accept message comprises first information, the first information comprises N paging group IDs allocated for a paging area list registered by the terminal device in a core network, the paging area list comprises M paging area identities, and both M and N are positive integers;

wherein after the receiving, by the terminal device, the registration accept message from the core network device, the method further comprises: receiving, by the terminal device, second information from the core network device, wherein the second information is configured to update the paging group IDs;

wherein the second information is configured to modify one or more paging group ID which has been allocated to one or more paging area identity.

2. The method according to claim 1, wherein the second information is further configured to:

release the one or more paging group ID which has been allocated to the one or more paging area identity.

3. The method according to claim 1, wherein the receiving, by the terminal device, the second information from the core network device, comprises:

receiving, by the terminal device, a Non Access Stratum (NAS) message from the core network device, wherein the NAS message comprises the second information.

4. The method according to claim 3, wherein the NAS message is a configuration update command message.

5. The method according to claim 1, wherein the core network device is an Access and Mobility Management Function (AMF) entity.

6. A terminal device, comprising:

a memory, configured to store a computer program; and a processor, wherein when the processor executes the computer program, the processor is configured to implement: receive a registration accept message from a core network device, wherein the registration accept message comprises first information, the first information comprises N paging group IDs allocated for a paging area list registered by the terminal device in a core network, the paging area list comprises M paging area identities, and both M and N are positive integers;

wherein after receiving the registration accept message from the core network device, the processor is further configured to receive second information from the core network device, wherein the second information is configured to update the paging group IDs;

wherein the second information is configured to modify one or more paging group ID which has been allocated to one or more paging area identity.

7. The terminal device according to claim 6, wherein the second information is further configured to:

release the one or more paging group ID which has been allocated to the one or more paging area identity.

8. The terminal device according to claim 6, wherein the processor is further configured to receive a Non Access Stratum (NAS) message from the core network device, wherein the NAS message comprises the second information;

wherein the NAS message is a configuration update command message.

9. The terminal device according to claim 6, wherein the core network device is an Access and Mobility Management Function (AMF) entity.

10. A core network device, comprising:

a memory, configured to store a computer program; and a processor, wherein when the processor executes the computer program, the processor is configured to: transmit a registration accept message to a terminal device, wherein the registration accept message comprises first information, the first information comprises N paging group IDs allocated for a paging area list registered by the terminal device in a core network, the paging area list comprises M paging area identities, and both M and N are positive integers;

wherein after transmitting the registration accept message to the terminal device, the processor is further configured to transmit second information to the terminal device, wherein the second information is configured to update the paging group IDs;

wherein the second information is configured to modify one or more paging group ID which has been allocated to one or more paging area identity.

11. The core network device according to claim 10, wherein the second information is further configured to:

release the one or more group ID which has been allocated to the one or more paging area identity.

12. The core network device according to claim 10, wherein the processor is further configured to transmit a Non Access Stratum (NAS) message to the terminal device, wherein the NAS message comprises the second information.

13. The core network device according to claim 12, wherein the NAS message is a configuration update command message.

14. The core network device according to claim 10, wherein the core network device is an Access and Mobility Management Function (AMF) entity.

* * * * *